United States Patent [19]
Vest et al.

[11] Patent Number: 5,482,688
[45] Date of Patent: Jan. 9, 1996

[54] PLUTONIUM DISSOLUTION PROCESS

[75] Inventors: Michael A. Vest, Oak Park, Ill.; Samuel D. Fink, Aiken, S.C.; David G. Karraker, Aiken, S.C.; Edwin N. Moore, Aiken, S.C.; H. Perry Holcomb, North Augusta, S.C.

[73] Assignee: The United States of America as represented by the United States Department of Energy, Washington, D.C.

[21] Appl. No.: 193,380

[22] Filed: Feb. 7, 1994

[51] Int. Cl.$^6$ ..................................................... B01F 1/00
[52] U.S. Cl. ........................................... 423/20; 423/251
[58] Field of Search ............................... 423/18, 20, 251

[56] References Cited

U.S. PATENT DOCUMENTS

| | | | |
|---|---|---|---|
| 2,546,933 | 3/1951 | Steahly et al. | 423/20 |
| 2,741,541 | 4/1956 | Smith | 423/20 |
| 2,863,718 | 12/1958 | Overholt | 423/7 |
| 2,897,047 | 7/1959 | Schulz | 423/20 |
| 2,898,186 | 8/1959 | Hopkins, Jr. | 423/20 |
| 2,938,768 | 5/1960 | Knox et al. | 423/20 |
| 2,942,938 | 6/1960 | Facer et al. | 423/20 |
| 3,208,817 | 9/1965 | Jenkins | 423/251 |
| 3,222,125 | 12/1965 | Schulz | 423/20 |
| 3,259,473 | 7/1966 | Hopkins et al. | 423/251 |
| 3,410,668 | 11/1968 | Conner | 423/20 |
| 3,813,464 | 5/1974 | Ayers | 423/20 |
| 4,197,274 | 4/1980 | Memoto et al. | 423/3 |
| 4,333,912 | 6/1982 | Mills et al. | 423/20 |
| 4,434,137 | 2/1984 | Stoll et al. | 423/6 |
| 5,135,728 | 8/1992 | Karraker | 423/20 |

*Primary Examiner*—Ngoclan Mai
*Attorney, Agent, or Firm*—Brian R. Tumm; Harold M. Dixon; William R. Moser

[57] ABSTRACT

A two-step process for dissolving plutonium metal, which two steps can be carried out sequentially or simultaneously. Plutonium metal is exposed to a first mixture containing approximately 1.0M–1.67M sulfamic acid and 0.0025M–0.1M fluoride, the mixture having been heated to a temperature between 45° C. and 70° C. The mixture will dissolve a first portion of the plutonium metal but leave a portion of the plutonium in an oxide residue. Then, a mineral acid and additional fluoride are added to dissolve the residue. Alternatively, nitric acid in a concentration between approximately 0.05M and 0.067M is added to the first mixture to dissolve the residue as it is produced. Hydrogen released during the dissolution process is diluted with nitrogen.

18 Claims, 1 Drawing Sheet

PLUTONIUM DISSOLUTION PROCESS

BACKGROUND OF THE INVENTION

1. Field of the Invention

The present invention relates to the recovery of plutonium metal. In particular, the present invention relates to a process for dissolving plutonium metal in a sulfamic acid—fluoride solution. The United States Government has rights in this invention pursuant to Contract No. DE-AC09-89SR18035 between the U.S. Department of Energy and Westinghouse Savannah River Company.

2. Discussion of Background

Plutonium can be used as a reactor fuel, as a power source in satellites, and in a number of defense-related applications. In many of these applications, accumulation of fission products over a period of time necessitates withdrawal of the remaining plutonium for reprocessing and recovery of the plutonium. Fission products absorb neutrons that might otherwise be absorbed by fissionable plutonium.

Plutonium recovery and purification typically begins by dissolving plutonium-containing alloys or compounds in an acid solution. It is known to recover actinides such as plutonium from precipitates or slag by dissolution in nitric acid, as in the processes described by Knox, et al. (U.S. Pat. No. 2,938,768) and Hopkins (U.S. Pat. No. 2,898,186).

Plutonium and plutonium oxide are difficult to dissolve, even in highly concentrated acid solutions. Therefore, many processes depend on catalysts. Mills, et al. (U.S. Pat. No. 4,333,912) increase the solubility of plutonium dioxide and plutonium/uranium oxide fuels in nitric acid by adjusting the plutonium:uranium ratio so that the plutonium acts as an autocatalyst. Schulz (U.S. Pat. No. 3,222,125) first immerses an aluminum-based nuclear fuel in nitric acid containing mercuric ion catalyst, then increases the nitric acid concentration to complete dissolution. Schulz (U.S. Pat. No. 2,897,047) accelerates dissolution of metallic uranium by adding ortho-phosphoric acid to nitric acid.

Fluoride ions are used as catalysts for speeding up the dissolution of plutonium and plutonium oxides. Plutonium metal is soluble in mixtures of nitric acid and hydrofluoric acid (Facer, et al., U.S. Pat. No. 2,942,938), and in nitric acid containing hydrazine and catalytic amounts of fluoride anions (Hopkins, et al., U.S. Pat. No. 3,259,473). Plutonium oxide can also be dissolved in a solution that contains nitric acid, plutonium in solution and fluoride ions in a small, catalytically active amount (Stoll, et al., U.S. Pat. No. 4,434,137). In commonly-assigned U.S. Pat. No. 5,135,728, Karraker describes a method for dissolving delta-phase plutonium in a mixture of nitric acid, hydroxylammonium nitrate (HAN), potassium fluoride and sulfamic acid.

Fluoride-containing mineral acid solutions are also used to recover other actinides. For example, Smith (U.S. Pat. No. 2,741,541) recovers uranium from mixtures containing lower uranium oxides by treating the oxide with dilute aqueous sulfuric acid containing a fluoride. Steahly, et al. (U.S. Pat. No. 2,546,933) dissolve thorium and thorium compounds in nitric acid containing a small amount of fluorine-containing compounds such as hydrogen fluoride, fluosilicic acid, ammonium fluosilicate, and the like.

Sulfamic acid is used in several processes. Jenkins (U.S. Pat. No. 3,208,817) dissolves plutonium metal in a mixture of sulfamic and nitric acids. Sulfamic acid is used as a reductant to adjust plutonium in aqueous nitric acid solution to the $Pu^+$ oxidation state (Nemoto, et al., U.S. Pat. No. 4,197,274; Overholt, et al., U.S. Pat. No. 2,863,718). The small amount of sulfamic acid ($\leq 0.1M$) in the Karraker mixture is not sufficient to dissolve plutonium but assures stability of the hydroxylammonium nitrate in the presence of nitric acid (U.S. Pat. No. 5,135,728).

Typical plutonium dissolution processes focus on producing a product solution that can be fed directly to a solvent extraction process, usually a nitric acid-based process. These dissolution processes use highly corrosive mixtures, such as mixtures of concentrated nitric acid and hydrofluoric acid, that require process equipment made of special halide-resistant alloys. Alternatively, stainless steel vessels must be provided with platinum or corrosion-resistant polytetrafluoroethylene liners that are costly or impractical for use on an industrial scale. Many dissolution processes have unpredictable production rates, side reactions that generate large amounts of hydrogen, and produce unacceptable quantities of plutonium-containing residues including hydrides. Hydrogen must be handled carefully to prevent its concentration from approaching the explosive limit. Production of plutonium-containing residues reduces the yield of the process. In addition, plutonium hydride is pyrophoric, that is, it oxidizes rapidly in air and can ignite spontaneously during servicing of process equipment.

There is a need for a plutonium dissolution process that rapidly and efficiently dissolves plutonium metal, produces a minimal quantity of plutonium-containing waste, and does not require process equipment made of costly, halide-resistant materials.

SUMMARY OF THE INVENTION

According to its major aspects and broadly stated, the present invention is a two-step process for dissolving plutonium metal. In the first step, plutonium metal is dissolved in a mixture of sulfamic acid and a fluoride. Nitric acid and additional fluoride are added in the second step to the mixture to dissolve the plutonium-containing residue (primarily plutonium oxide) produced during the dissolution process. Alteratively, nitric acid can be added to the sulfamic acid—fluoride mixture to dissolve the residue as it is produced, to have step two take place simultaneously with step one rather than sequentially. To reduce the formation of unstable hydrides and the risk of hydrogen deflagrations, gaseous hydrogen released during the process is diluted with nitrogen. The final product is a solution that contains plutonium ions in the trivalent oxidation state ($Pu^{+3}$) and which may be diluted with nitric acid before feeding to a typical nitric acid-based solvent extraction process to recover pure plutonium metal. Alteratively, the dissolved plutonium product may be used in some other type of plutonium recovery process.

Unlike those plutonium dissolution processes that focus on a product solution that can be fed directly to a nitric acid-based extraction process, the process of the present invention looks to the use of relatively noncorrosive solutions that do not require the use of costly, halide-resistant process equipment. Although the product should be diluted with nitric acid before the dissolved plutonium metal is extracted from solution, treating the resulting larger volume of plutonium ion-containing solution is cost-effective because the dissolution process can be carried out in ordinary stainless steel vessels.

An important feature of the present invention is the use of sulfamic acid to dissolve plutonium metal. The plutonium is dissolved in a mixture of 1.0M–1.67M sulfamic acid and 0.0025M–0.1M fluoride ions, heated to a temperature between approximately 45° C. and 70° C. This mixture is less corrosive than the nitric acid—fluoride solutions used in many dissolution processes, allowing the use of process equipment made of stainless steel rather than fluoride-resistant alloys.

Another feature of the present invention is the ability to treat the residue that results from the dissolution process. In a preferred embodiment of the invention, a mineral acid such as nitric acid (0.5M–4M) or sulfuric acid (0.25M–0.5M), and a fluoride (up to approximately 0.1M) are added to the mixture after dissolution of the plutonium metal to dissolve the plutonium-containing constituents of the residue. In an alternative preferred embodiment, a small amount of nitric acid (0.05M–0.067M) is added to the sulfamic acid—fluoride mixture to dissolve the residue as it is produced. This capability increases the yield of the process, reduces the overall production of undesirable byproducts, and reduces the accumulation of unstable, pyrophoric hydrides in process equipment.

Still another feature of the present invention is removal of hydrogen that is released during the process, thereby reducing the risk of hydrogen deflagrations during servicing of process equipment.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
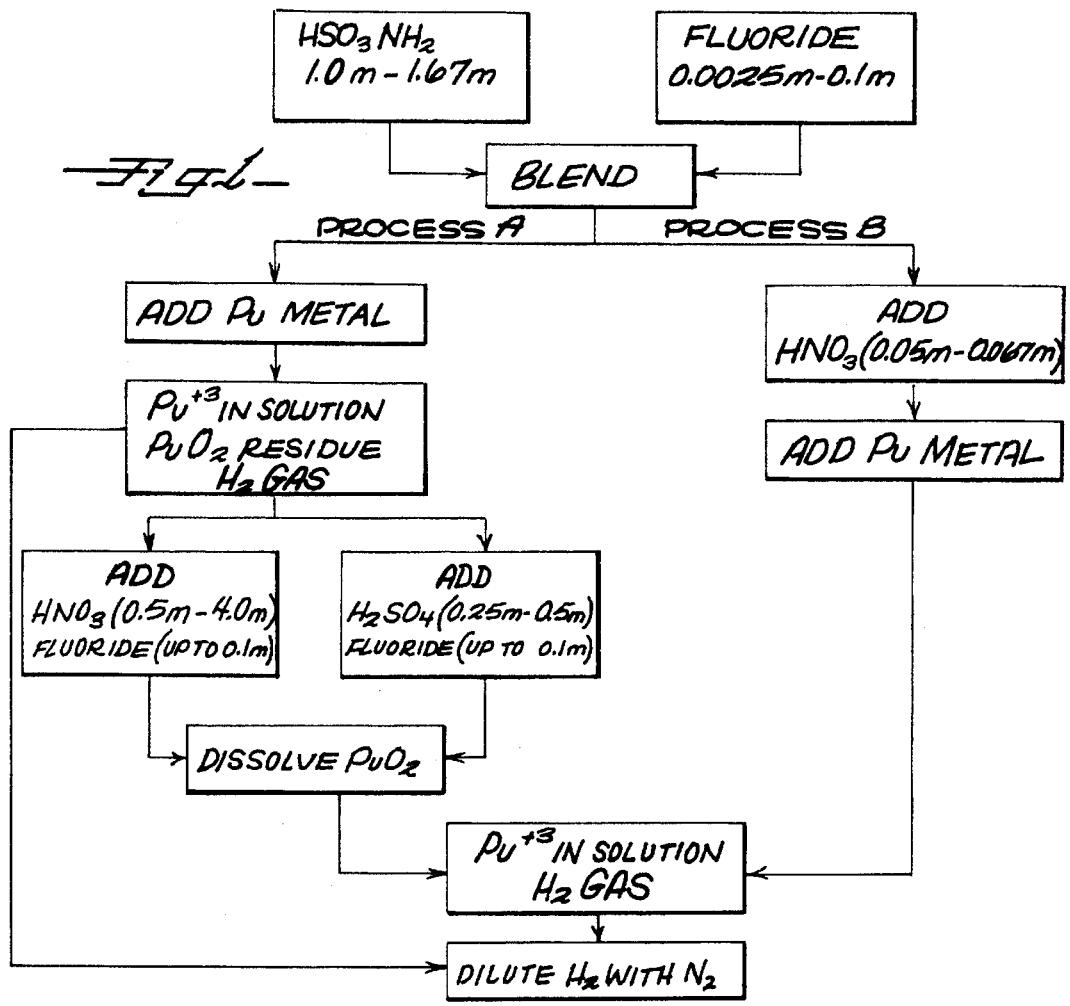
FIG. 1 is a flow chart of a process for dissolving plutonium metal according to a preferred embodiment of the present invention.

Referring now to FIG. 1, there is illustrated a process according to a preferred embodiment of the present invention for dissolving plutonium metal in a mixture comprising specific ranges of sulfamic acid ($HSO_3NH_2$) and a fluoride. After dissolution is substantially complete, acid and additional fluoride are added to the mixture to dissolve the residue formed during the dissolution process (Process A). Alternatively, plutonium is immersed in a mixture of sulfamic acid, nitric acid, and a fluoride (Process B). The sulfamic acid dissolves the metal while the nitric acid dissolves the residue. Hydrogen released during the process is diluted with nitrogen to help prevent hydrogen deflagrations and formation of unstable hydrides.

The product is a solution that contains plutonium ions in the $Pu^{+}$ oxidation state. To recover pure plutonium metal, the product solution is diluted with nitric acid and used as feed for a nitric acid-based solvent extraction process. While this may result in a greater volume of plutonium ion-containing solution to be treated, the process has reduced engineering requirements and equipment costs when compared to other dissolution processes that produce a solution that can be fed directly to a nitric acid-based extraction process.

The process is carried out as follows:

A first mixture having a sulfamic acid concentration of at least approximately 1.0M and a fluoride ion concentration between approximately 0.0025M and 0.1M is prepared. When plutonium metal is immersed in the first mixture, dissolution proceeds according to the equation:

$$2Pu + 6HSO_3NH_2 \rightarrow 3H_2\uparrow + 2Pu(H_2NSO_3)_3.$$

Byproducts of dissolution include gaseous hydrogen and a residue that contains primarily plutonium oxide.

The higher the temperature of the first mixture, the faster the dissolution rate of plutonium metal therein. Preferably, the temperature is held between approximately 45° C. and 70° C., the exact temperature depending on the desired dissolution rate: the higher the temperature, the higher the dissolution rate. Plutonium dissolution is exothermic, therefore, the process apparatus may need to be cooled as the reaction proceeds to maintain the temperature within the optimum range.

A sufficient quantity of the first mixture is provided to dissolve the desired amount of plutonium. As the plutonium dissolves, the sulfamic acid concentration of the first mixture decreases. Therefore, the initial sulfamic acid concentration must be sufficiently high to allow the dissolution reaction to proceed promptly to completion, preferably between approximately 1.0M and 1.67M, or near the solubility limit of sulfamic acid at the high end of the temperature range. If desired, additional sulfamic acid may be added to the first mixture during dissolution to maintain the concentration within a preferred range. Alternatively, solid sulfamic acid may be added to the first mixture to gradually dissolve as dissolution proceeds. The optimum quantity of the first mixture—and its initial sulfamic acid concentration—depends on the quantity of plutonium metal to be dissolved, the desired dissolution rate, and the desired plutonium concentration of the product solution.

As noted above, the gaseous hydrogen released during dissolution is diluted with nitrogen to prevent hydrogen deflagrations and reduce the rate of formation of pyrophoric hydrides. Preferably, the hydrogen content of the diluted off-gas is no higher than approximately 4 vol. %. The progress of the dissolution reaction may be monitored by measuring the hydrogen content of the off-gas, since dissolution has ceased when no more hydrogen is released.

The fluoride acts as a catalyst for dissolving the plutonium metal in sulfamic acid. Therefore, the optimum fluoride ion concentration in the first mixture depends on the amount of plutonium metal to be dissolved, the sulfamic acid concentration, the temperature and the desired dissolution rate. The fluoride ion concentration is preferably between approximately 0.0025M and 0.1M, however, concentrations outside this range may be used. Any fluoride ion source may be used in the practice of the invention, including but not limited to solutions of compounds such as potassium fluoride (KF), sodium fluoride (NaF), hydrogen fluoride (HF) and mixtures thereof.

In a preferred embodiment of the present invention, plutonium-containing residue (primarily plutonium oxide) is treated by adding nitric acid and fluoride to the mixture after dissolution is substantially complete (Process A). Alternatively, a small amount of nitric acid is added to the first mixture to dissolve the residue as it is produced (Process B). Processes A and B are carried out as follows:

Process A

Plutonium dissolution is accomplished by exposing a solid charge of metal to the first mixture. On the order of 75 wt. % or more of the initial charge is dissolved at a rate that depends on the ratio of surface area to volume of the metal and the characteristics of the first mixture. The quantity of residue typically contains about 10 wt. % of the dissolved plutonium, primarily in the form of plutonium oxide. The plutonium in solution is primarily in the trivalent oxidation state ($Pu^{+3}$). For faster and/or more complete dissolution, the plutonium metal or alloy may be supplied in the form of fine shavings or a powder.

After at least a portion, and preferably most of the plutonium metal has dissolved, the plutonium-containing residue is dissolved. An acid and additional fluoride are added to form a second mixture for dissolving the residue, which contains primarily plutonium oxide and may contain other compounds such as plutonium sulfate and hydrated plutonium oxide. The acid concentration is adjusted to a level sufficient to dissolve the residue, and additional fluoride ions (if needed) are added to serve as a catalyst. The preferred fluoride ion concentration is up to approximately 0.1M, but higher or lower concentrations may be used. The fluoride concentration should be high enough to catalyze dissolution of the residue by the nitric acid, but not so high that plutonium in the form of $PuF_3$ is precipitated from the mixture. The acid and fluoride concentrations of the second mixture can be adjusted so that the final residue contains no more than approximately 1 wt. % of the dissolved plutonium (about 0.5 wt. % of the initial plutonium charge).

The acid is preferably a mineral acid selected from the group consisting essentially of nitric acid and sulfuric acid. However, other acids capable of dissolving plutonium oxide may be used if desired. The optimum acid concentration depends on the choice of acid, the quantity of plutonium oxide to be dissolved, the concentration of fluoride ions in the second mixture, and the temperature of the mixture. If nitric acid is used, the optimum acid concentration is between approximately 0.5M–4.0M, preferably no more than about 2M; if sulfuric acid, between approximately 0.25M–0.5M.

Reaction end points can be estimated from rate equations known in the art. Alternatively, the final concentration of $Pu^+$ can be monitored by spectrophotometry or electrical conductivity measurements.

It is well known that neither nitric acid nor sulfuric acid alone is capable of dissolving plutonium metal. Even when combined with fluoride ions, acid concentrations as high as 16M are needed to dissolve plutonium. Such mixtures are highly corrosive, produce large quantities of residues that must be disposed of, and require process equipment made of special halide-resistant alloys. The first and second mixtures according to the present invention are less corrosive that other acid solutions used to dissolve plutonium. The first mixture, containing sulfamic acid and a fluoride, is substantially less corrosive than typical nitric acid-fluoride mixtures. The second mixture contains a sufficient concentration of nitric or sulfuric acid to dissolve the residue, but at a concentration too low to dissolve a significant quantity of plutonium metal. Both mixtures may be used with stainless steel vessels, including Types 304 and 312 stainless steel. Of course, equipment made of corrosion-resistant alloys such as the INCONEL alloys may be used if desired.

Process B

In an alternative preferred embodiment of the invention, the residue is treated as it is formed. Nitric acid is added to the first mixture, to form a mixture having a nitric acid concentration between approximately 0.05M and 0.067M, a sulfamic acid concentration between approximately 1.0M and 1.67M, and a fluoride ion concentration between approximately 0.0025M and 0.1M. The sulfamic acid dissolves the plutonium metal as described above, while the nitric acid dissolves the residue substantially as it is formed. The optimum nitric acid concentration depends on the rate of formation of the residue and the dissolution rate of the plutonium metal. While nitric acid is preferred, other acids that are capable of dissolving the residue may be used. If some other acid is used to dissolve the residue, optimum results may require a different acid concentration than that listed for nitric acid.

The quantity of the mixture—and the initial concentrations of sulfamic acid, nitric acid and fluoride therein—are such as dissolve the desired amount of plutonium metal and essentially simultaneously dissolve the residue. These are best determined by a modest amount of experimentation for each particular set of conditions. If desired, the sulfamic acid, nitric acid and fluoride concentrations may be adjusted during the process to maintain the concentrations within their optimum ranges.

Up to approximately 60 wt. % or more of a solid plutonium charge is dissolved by the mixture at a rate that depends on the initial mass of the metal, the acid concentration and the fluoride concentration of the mixture. Most of the plutonium-containing residue is also dissolved but leaving an undissolved residue that should contain no more than about 2.5 wt. % of the dissolved plutonium (about 1.5 wt. % of the initial plutonium charge). That is, about 60 g of an initial plutonium charge of 100 g is dissolved by the sulfamic oxide. Of this 60 g, the residue contains no more than about 1.5 g in the form of compounds such as plutonium oxide.

As noted above, the plutonium metal may be supplied in the form of shavings or a powder for faster and/or more complete dissolution. Reaction end points can be estimated from rate equations known in the art, or predicted by spectrophotometry or measurements of the electrical conductivity of the mixture.

The initial nitric acid concentration of the mixture is preferably no higher than about 0.067M. Importantly in comparison to other methods of dissolving plutonium, such low concentrations of nitric acid are incapable of dissolving any substantial amount of plutonium metal, even in the presence of catalytically active fluoride ions. Furthermore, the nitric acid and fluoride ion concentrations of the mixture are kept too low to precipitate plutonium fluoride from the mixture. While not wishing to be bound by theory, it is believed that the plutonium metal is dissolved by the sulfamic acid, while the plutonium-containing residue is dissolved by the nitric acid essentially at the same rate it is produced. The nitric acid may at least partially prevent formation of plutonium-containing residue by some as yet unknown mechanism.

Of course, it is desired to maximize the quantity of dissolved plutonium and minimize the amount of plutonium-containing residue. When the residue is dissolved after direct dissolution of the initial plutonium metal charge is substantially complete, as in Process A, on the order of 75 wt. % of the initial plutonium charge is dissolved. The final residue contains less than 1 wt. % of the dissolved plutonium (less than approximately 0.5 wt. % of the initial plutonium charge). If, on the other hand, the sulfamic acid—nitric acid—fluoride mixture of Process B is used to simultaneously dissolve plutonium metal and treat plutonium-containing residues, about 60 wt. % of the initial charge is dissolved, leaving a residue that may contain as much as 2.5 wt. % of the dissolved plutonium (about 1.5 wt. % of the initial plutonium charge). Thus, 25 wt. % more of the initial plutonium charge may be dissolved using Process A than Process B, while generating less than one third the plutonium-containing residue. Thus, Process A is preferred when it is desired to minimize the amount of residue; Process B is preferred when the nitric acid concentration must be as low as possible.

It is known that plutonium has six different crystalline phases. Pure plutonium at room temperature is in the so-called alpha phase. Other phases, including the lower-density, more easily machinable delta phase preferred for reactor fuel and many defense-related applications, are unstable unless alloyed with another metal such as aluminum or gallium. Alpha-phase plutonium is stable at room temperature, but is brittle and difficult to machine. The process of the present invention may be used to dissolve both alpha-phase and delta-phase plutonium, as well as the other phases if desired.

Figure 2:
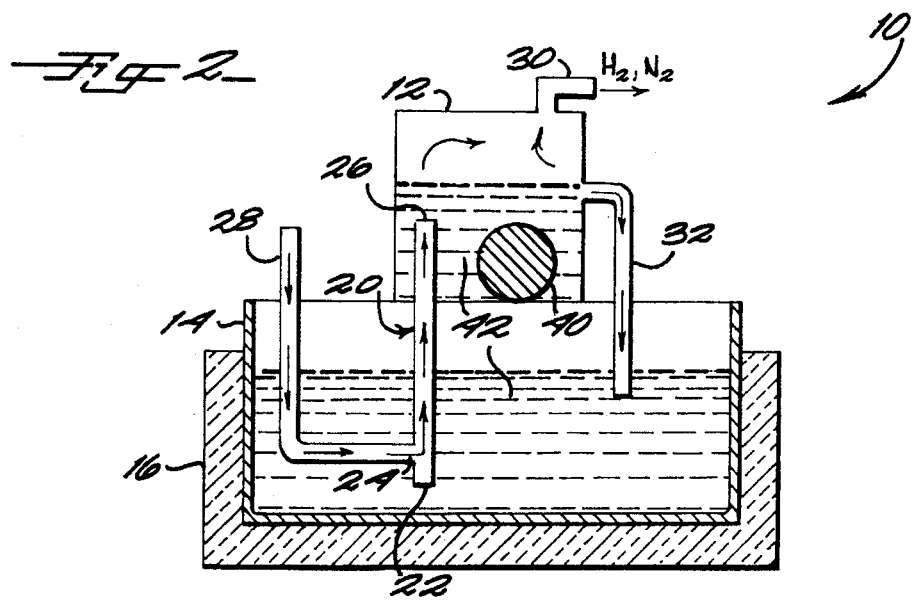
FIG. 2 is a schematic view of an apparatus used for carrying out the process of FIG. 1.

Referring now to FIG. 2, there is shown a schematic view of an apparatus for carrying out the process according to the present invention. An apparatus 10 includes a dissolver or metal charge compartment 12, a reservoir 12, and a temperature-control jacket 16 surrounding reservoir 12. An air-lift pump 20 has a fluid inlet 22 and a gas inlet 24 in reservoir 12, and an outlet 26 in dissolver 12. Nitrogen (or some other suitable gas) is supplied to gas inlet 24 via a conduit 28. Dissolver 12 has an off-gas outlet 30, and an overflow line 32 communicating with reservoir 14. Temperature sensors (not shown) are suitably disposed in dissolver 12 and reservoir 14. If desired, sensors (not shown) for monitoring the hydrogen content of the off-gas may be disposed in dissolver 12 or off-gas outlet 30.

In operation, a plutonium charge 40 is positioned in dissolver 12, and a sufficient quantity of a fluid 42 is placed in dissolver 12 to fill the dissolver to the level of overflow line 32. An additional quantity of fluid 40 is placed in reservoir 14. Fluid 42 may comprise a sulfamic acid—fluoride mixture for dissolving the plutonium such as the first mixture of Process A, or the sulfamic acid—fluoride—nitric acid mixture of Process B.

Pump 20 is activated to circulate fluid 42 between dissolver 12 and reservoir 14. Nitrogen entering at inlet 24 and fluid entering at inlet 22 are pumped to dissolver 12, where the nitrogen mixes with gaseous hydrogen produced by the plutonium dissolution process. As fluid 42 enters dissolver 12 at inlet 26, excess fluid 42 is returned to reservoir 14 via overflow line 32. The nitrogen—hydrogen gas mixture exits dissolver 12 through off-gas outlet 30.

The temperature of fluid 42 in dissolver 12 is maintained within a preferred range during operation of apparatus 10. Jacket 16 heats or cools reservoir 14 as needed; alteratively, a similar jacket may be provided for dissolver compartment 12.

The process of the present invention is illustrated by the following non-limiting examples.

EXAMPLE 1

A first mixture (fluid 42) having a sulfamic acid concentration of 1.67M and a fluoride ion concentration of 0.01M was prepared. An 11.0 g charge of delta-phase plutonium metal was placed in dissolver 12. 250 mL of the first mixture was placed in reservoir 14 and heated to 80° C. The first mixture was circulated between dissolver 12 and reservoir 14. During operation, the temperature of the fluid in dissolver 12 reached a maximum of 58° C. Dissolution was considered complete when off-gas flow had essentially stopped, that is, when the off-gas no longer contained hydrogen.

8.1 g plutonium metal (about 74 wt. % of the initial charge) was dissolved in 90 minutes. The residue (primarily plutonium oxide) represented about 10 wt. % of the dissolved plutonium (about 7.4 wt. % of the initial charge). The product solution had a sulfamic acid concentration of 0.59M and contained 31 g/L plutonium.

Fluid 42 was adjusted to a nitric acid concentration of 2M and a fluoride ion concentration of 0.1M, and circulated through dissolver 12 for an additional 45 minutes to dissolve the residue. After completion of the process, the final residue contained 0.62 wt. % of the dissolved plutonium (about 0.46 wt. % of the initial plutonium charge).

EXAMPLE 2

A mixture having a sulfamic acid concentration of 1.67M, a nitric acid concentration of 0.05M and a potassium fluoride concentration of 0.01M was prepared. An 11.0 g charge of solid delta-phase plutonium was placed in dissolver 12, and 250 mL of the mixture was circulated between dissolver 12 and reservoir 14. Dissolver 12 was heated to 60° C. After 90 minutes, 6.44 g of the initial plutonium charge had dissolved, for a final concentration of 10 g/L plutonium in 0.01M sulfamic acid. The residue contained 2.45 wt. % of the dissolved plutonium (about 1.4 wt. % of the initial plutonium charge).

It will be apparent to those skilled in the art that many changes and substitutions can be made to the preferred embodiment herein described without departing from the spirit and scope of the present invention as defined by the appended claims.

What is claimed is:

1. A process for dissolving plutonium metal, said process comprising the steps of:

making a mixture of sulfamic acid and a fluoride ion, said mixture containing said sulfamic acid in a concentration between approximately 1.0M and 1.67M, said mixture containing said fluoride ion in a concentration between approximately 0.0025M and 0.1M;

heating said mixture;

exposing said plutonium metal to said mixture whereby at least a first portion of said plutonium dissolves in said mixture and a second portion of said plutonium reacts with said mixture to form plutonium oxide; and dissolving said plutonium oxide in an acid.

2. The process as recited in claim 1, wherein said mixture is heated to a temperature between approximately 45° C. and approximately 70° C.

3. The process as recited in claim 1, wherein said fluoride ion is provided by a solution of a compound selected from the group consisting essentially of sodium fluoride, hydrogen fluoride, potassium fluoride and mixtures thereof.

4. The process as recited in claim 1, wherein said dissolution of said first portion releases; hydrogen, and said method further comprises the step of diluting said released hydrogen with nitrogen.

5. The process as recited in claim 1, wherein said dissolving step takes place in the presence of fluoride ions.

6. The process as recited in claim 1, wherein said acid is selected from the group consisting essentially of nitric acid and sulfuric acid.

7. The process as recited in claim 1, wherein said acid is nitric acid at a concentration between approximately 0.5M and approximately 4.0M.

8. The process as recited in claim 1, wherein said acid is sulfuric acid having a concentration between approximately 0.25M and approximately 0.5M.

9. The process as recited in claim 1, wherein said mixture includes nitric acid.

10. The process as recited in claim 1, wherein said mixture includes nitric acid having; a concentration between approximately 0.05M and approximately 0.067M.

11. A process for dissolving plutonium metal, said process comprising the steps of:

making a first mixture of sulfamic acid and fluoride ions, said sulfamic acid having a concentration between approximately 1.0M and approximately 1.67M, said fluoride ions having a concentration between approximately 0.0025M and approximately 0.1M;

heating said first mixture;

exposing said plutonium :metal to said first mixture whereby a first portion of said plutonium dissolves in said first mixture to form a solution containing $Pu^+$ ions, and whereby a second portion of said plutonium reacts with said first mixture to form plutonium oxide; and adding an acid and a quantity of fluoride ions to said solution to make a second mixture to dissolve said plutonium oxide, said fluoride ions having a concentration not more than approximately 0.1M.

12. The process as recited in claim 11, wherein said first mixture and said second mixture are heated to a temperature between approximately 45° C. and approximately 70° C.

13. The process as recited in claim 11, wherein said fluoride ions are provided by a solution of a compound selected from the group consisting essentially of sodium fluoride, hydrogen fluoride, potassium fluoride and mixtures thereof.

14. The process as recited in claim 11, wherein said acid is selected from the group consisting essentially of nitric acid and sulfuric acid.

15. The process as recited in claim 11, wherein said acid is nitric acid at a concentration between approximately 0.5M and approximately 4.0M.

16. The process as recited in claim 11, wherein said acid is sulfuric acid at a concentration between approximately 0.25M and approximately 0.5M.

17. A process for dissolving plutonium metal, said process comprising the steps of:

making a mixture of sulfamic acid, nitric acid and fluoride ions, said sulfamic acid having a concentration between approximately 1.0M and approximately 1.67M, said fluoride ions having a concentration between approximately 0.0025 and approximately 0.1M, said nitric acid having a concentration between approximately 0.05 and approximately 0.067M;

heating said mixture to a temperature between approximately 45° C. and approximately 70° C.; and exposing said plutonium metal to said heated mixture whereby said plutonium metal dissolves.

18. The process as recited in claim 17, wherein said fluoride ions are provided by a solution of a compound selected from the group consisting essentially of sodium fluoride, hydrogen fluoride, potassium fluoride and mixtures thereof.

\* \* \* \* \*